United States Patent
Yadav et al.

(10) Patent No.: US 9,071,611 B2
(45) Date of Patent: Jun. 30, 2015

(54) INTEGRATION OF NETWORK ADMISSION CONTROL FUNCTIONS IN NETWORK ACCESS DEVICES

(75) Inventors: Navindra Yadav, Cupertino, CA (US); Atul Mahamuni, Fremont, CA (US); Azim Ozakil, San Jose, CA (US); Bora A. Akyol, Richland, WA (US); Peirong Feng, Sunnyvale, CA (US); Thomas J. Enderwick, La Jolla, CA (US); Aji Joseph, San Jose, CA (US); Shashi Kumar, San Jose, CA (US); Sambasivam Valliappan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 12/932,456

(22) Filed: Feb. 23, 2011

(65) Prior Publication Data

US 2012/0216239 A1 Aug. 23, 2012

(51) Int. Cl.
*H04L 29/06* (2006.01)
(52) U.S. Cl.
CPC .......... *H04L 63/102* (2013.01); *H04L 63/0236* (2013.01); *H04L 63/0227* (2013.01); *H04L 63/0892* (2013.01)

(58) Field of Classification Search
None
See application file for complete search history.

(56) References Cited

U.S. PATENT DOCUMENTS

| 7,899,039 | B2 | 3/2011 | Andreasen et al. |
| 7,903,817 | B2 | 3/2011 | Cam-Winget et al. |
| 2004/0181690 | A1* | 9/2004 | Rothermel et al. ........... 713/201 |
| 2005/0240990 | A1* | 10/2005 | Trutner et al. ................. 726/11 |
| 2007/0109983 | A1* | 5/2007 | Shankar et al. ............ 370/310.2 |
| 2009/0217353 | A1* | 8/2009 | Zheng ............................... 726/3 |
| 2010/0071024 | A1* | 3/2010 | Eyada ................................ 726/1 |
| 2010/0223654 | A1* | 9/2010 | Kwan et al. ....................... 726/1 |

* cited by examiner

*Primary Examiner* — David Pearson
(74) *Attorney, Agent, or Firm* — Cindy Kaplan

(57) ABSTRACT

In one embodiment, a method includes receiving a communication from an endpoint device at a network access device located within a data path between the endpoint device and a network, identifying a network admission control policy for the endpoint device, enforcing at the network access device, the network admission control policy for traffic received from the endpoint device, and forwarding at the network access device, traffic from the endpoint device to the network in accordance with the network admission control policy. An apparatus is also disclosed.

19 Claims, 5 Drawing Sheets

INTEGRATION OF NETWORK ADMISSION CONTROL FUNCTIONS IN NETWORK ACCESS DEVICES

TECHNICAL FIELD

The present disclosure relates generally to integrating functions related to network admission control enforcement or profiling in network access devices.

BACKGROUND

It is important for networks to be protected from security threats which can disrupt business and cause downtime. Network admission control is used to enforce security policy compliance on devices that attempt to gain access to a network. In a network with conventional network admission control deployed, traffic to an end station and traffic from an end station is sent via a network admission control appliance. The network admission control appliance establishes the state of the end station, inspects the traffic and then determines which network policy should be enforced. In most cases, the network admission control appliance is an engine implemented in software and is centralized. Traffic is typically directed to the appliance using virtual local area networks (VLANs). The appliance inspects the traffic and injects the traffic to appear in the appropriate healthy virtual local area network if appropriate. A conventional profiler appliance used to identify end stations is also located within the network and has visibility to a very small subset of traffic (e.g., DHCP exchanges).

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
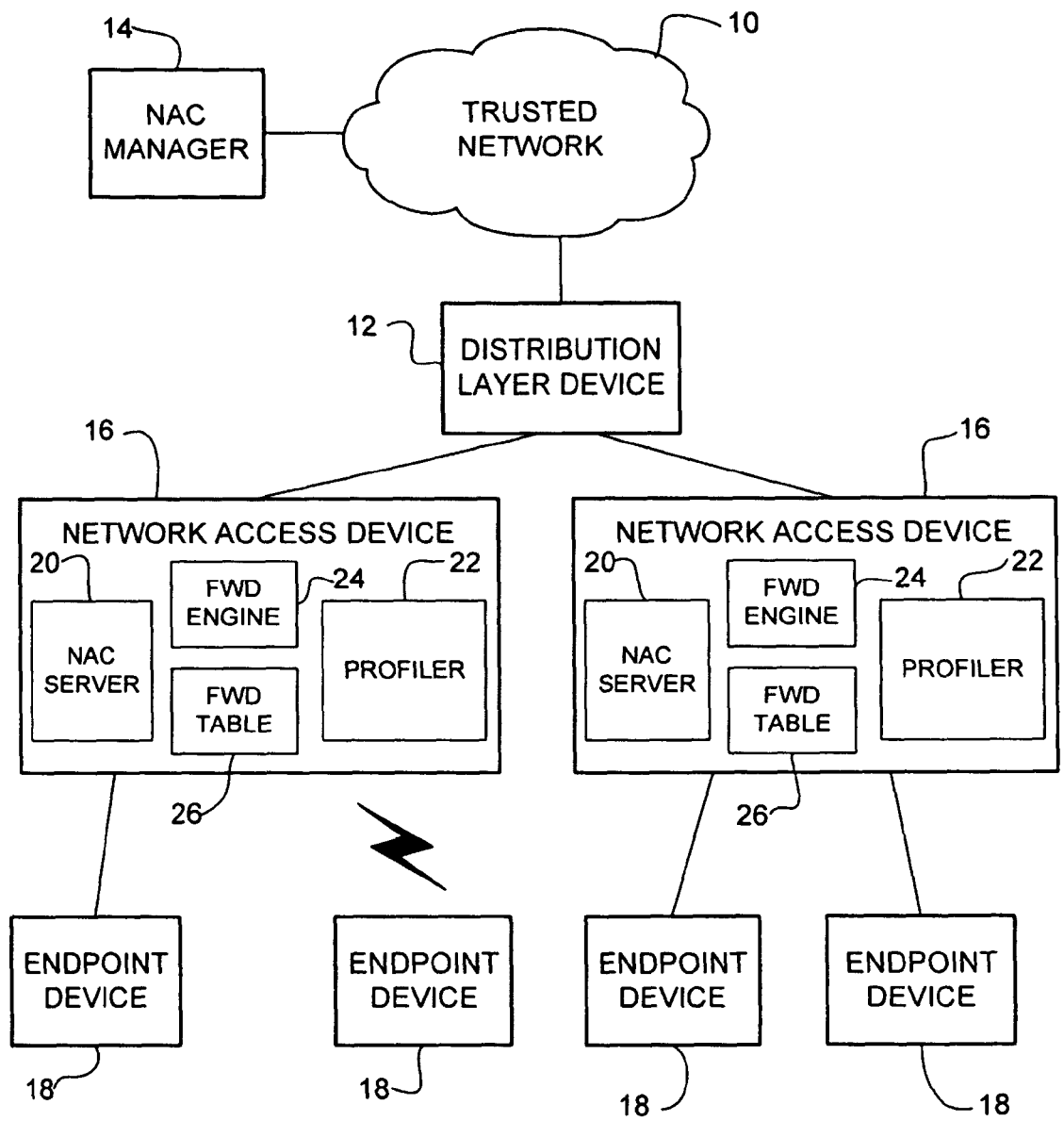
FIG. 1 illustrates an example of a network in which embodiments described herein may be implemented.

In one embodiment, a method generally comprises receiving a communication from an endpoint device at a network access device located within a data path between the endpoint device and a network, identifying a network admission control policy for the endpoint device, enforcing at the network access device, the network admission control policy for traffic received from the endpoint device, and forwarding traffic from the endpoint device to the network in accordance with the network admission control policy.

In another embodiment, an apparatus generally comprises a forwarding engine for receiving traffic from an endpoint device and forwarding the traffic to a network and a network admission control server for identifying a network admission control policy for the endpoint device and enforcing the network admission control policy for traffic received from the endpoint device. The apparatus is configured for operation within a data path between the endpoint device and the network.

In yet another embodiment, an apparatus generally comprises a forwarding engine for receiving traffic from an endpoint device and forwarding the traffic to a network, and a profiler for identifying an endpoint device in communication with the apparatus and providing identification information for each of the endpoint devices in communication with the apparatus to a manager. The apparatus is configured for operation within a data path between the endpoint device and the network.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications. Thus, the embodiments are not to be limited to those shown, but are to be accorded the widest scope consistent with the principles and features described herein. For purpose of clarity, features relating to technical material that is known in the technical fields related to the embodiments have not been described in detail.

Network admission control (NAC) (also referred to as network access control) is used to enforce policies on endpoint devices that attempt to gain access to a network. In one or more of the embodiments described herein, NAC policy enforcement is performed at a network access device (e.g., switch, router), with centralized network admission control management. The policies are applied in a data path between the endpoint device and the network, at a point at which traffic enters the network. Integration of NAC policy enforcement functions at the network access device eliminates the need for an external appliance and allows the network solution to scale and be easily deployed. Since the network access control is performed close to the endpoint device, the chances of cross infection of devices within the network are greatly reduced. Also, there is no need for VLAN (virtual local area network) steering (e.g., quarantined VLAN) and VLAN proliferation is avoided.

Profiling is used to identify the type of devices that are attempting to gain access to the network. Profiling may be used in network admission control or for tracking utilization, network planning, identifying at what location and how many devices of a particular type connect to the network over a period of time, etc. In one or more of the embodiments described herein, profiling is performed at the network access device. This allows for active dynamic profiling and more detailed profiling than available with a conventional profiler located at an appliance within the network.

As described below, the network access device may be configured to perform network admission control policy enforcement, profiling, or both policy enforcement and profiling. The profiling may be used in network admission control or other network functions.

Referring now to the figures, and first to FIG. 1, an example of a network that may implement embodiments described herein is shown. The embodiments operate in the context of a data communication network including multiple network elements. For simplification, only a small number of nodes are shown. The example shown in FIG. 1 includes a distribution layer device (e.g., aggregation layer switch) 12 in communication with a network access control manager 14 and two network access devices (access layer devices) 16. The aggregation layer device 12 is in communication with a trusted network 10 (e.g., internal network, corporate network, campus network, etc.), which includes protected resources. The distribution layer device 12 may be in communication with any number of other network devices or networks. The network access devices 16 are in communication with endpoint devices (user nodes, client nodes, end stations) 18. The endpoint devices 18 may be connected to the network using wired media (e.g., IEEE 802.3/Ethernet) or Wireless media (e.g., IEEE 802.11/WiFi).

It is to be understood that the network shown in FIG. 1 and described herein is only an example and that networks having other devices and topologies may be used without departing from the scope of the embodiments. Also, protocols other than discussed herein may be used for communication within the network.

The network access device 16 is located within the data path between the endpoint device 18 and the trusted network 10. The network access device 16 may be, for example, a switch (e.g., edge switch, wireless anchor switch), router, or any other network device configured to perform forwarding operations. The network access device 16 includes a forwarding engine 24 and a forwarding table 26. The term forwarding table as used herein may refer to a forwarding table at a switch, a routing table at a router, or any other data structure used to store forwarding or routing information used for Layer 2 or Layer 3 forwarding of traffic. The network access device 16 performs data path related actions and functions including, for example, policy enforcement, policing, shaping, tunneling, snooping, replication for inspection, etc. The network access device 16 may include a NAC (network admission control) server 20, profiler 22 or both NAC server and profiler, described in detail below.

The endpoint device 18 may be, for example, a desktop computer, laptop computer, IP phone, server, host, appliance, game console, printer, camera, sensor, mobile phone, personal digital assistant, or any other device configured for communication with a network device. The endpoint device 18 may or may not be associated with a user. The endpoint device 18 may be a wired device in communication with the network access device 16 using IEEE 802.3 Ethernet protocol, for example, or the endpoint device may be a wireless device using IEEE 802.11 protocol, for example. Communication may also include use of IEEE 802.1x or HTTPS (Hypertext Transfer Protocol Secure), or other protocols. The endpoint device 18 may also be configured for both wired communication (e.g., connected to a docking station) and wireless communication. Any number of nodes may be interposed between the network access device 16 and the endpoint device 18. For example, the network access device 16 may be in wired communication with an access point (not shown), which is in wireless communication with the endpoint device 18. The endpoint device 18 may also be a remote user.

The endpoint device 18 may include an agent (e.g., NAC agent, trust agent), an IEEE 802.1x supplicant, or both an agent and supplicant, for example. The agent is a program that resides on the endpoint device 18. When a user attempts to access the network via the end station, the NAC agent checks the endpoint device 18 for required software and helps the user acquire any missing updates or software. The supplicant runs on the endpoint device and provides credentials (e.g., username, password, digital certificate) to the NAC server 20, which forwards the credentials to an authentication server via the NAC manager 14, for example. The endpoint device 18 may also include a virus detector operable to detect a virus (e.g., virus, worm, spyware) or other damaging data at the endpoint device 18. The virus detector may be a collection of routines or programs that execute pattern matching, looking for a specific or systematic traffic behavior. The virus detector may communicate information associated with the type of damaging element to the NAC server 20 at the network access device 16.

The NAC manager 14 is a control and coordination point. The manager 14 stores policies for device type, user role, device posture, location, etc. The NAC manager 14 is an administration server and database that centralizes configuration and monitoring of all the NAC servers 20, users, and policies. The NAC manager 14 may receive data from any number of devices within the network. The manager 14 evaluates information from different sources and creates and manages the policies. There may be more than one NAC manager 14 in the network. For example, there may be two NAC managers that act in an active/standby configuration. The NAC server 20 is preferably in communication with only one centralized manager 14. In one embodiment, the NAC enforcement policies are configured on the manager 14 and downloaded by the network access device 16 based on need (e.g., as the endpoint device 18 is connected to network). If a policy definition changes, updates are pushed from the manager 14 to the network access device 16. Policies may be modified on a per group basis. The NAC manager 14 pushes any changes to group specific policies to relevant network access devices 16 and the network access device 16 replaces the enforcement policies for associated endpoint devices 18. Policies may also be updated based on changes at the endpoint device 18, as described below.

The NAC manager 14 may store policies that dictate what may be accessed and run by the endpoint devices 18. The NAC manager 14 communicates information to the NAC server 20 at the network access device 16, which enables the NAC server to implement policies based on specific restrictions or capabilities of the endpoint devices 18. The policies may cover, for example, QoS (Quality of Service), access/authorization privileges, high availability, priority, or any other network communications feature. Policy contents may include, for example, ACLs (access control lists) used to allow, deny, or limit traffic, DNS (domain name system) ACLs, web proxy (URL (uniform resource locator) filter), QoS attributes, VLAN changes (for backwards compatibility). In one embodiment, policies are enforced at the network access device 16 using service templates that are downloaded from the NAC manager 14 and locally configured at the network access device 16.

The NAC manager 14 may also be in communication with an authentication server (e.g., one or more access directory, access control server, AAA (authentication, authorization and accounting) server/proxy, etc.), policy server, application server, controller, client profile manager, or any other node, combination of nodes, or source (e.g., network administrator) that provides authentication or policy information for the endpoint devices 18. The authentication server may use, for example EAP (Extensible Authentication Protocol), EAPoUDP (EAP over User Datagram Protocol), Web Portal authentication, IEEE 802.1x, RADIUS (Remote Authentication Dial in User Service), or any other authentication scheme.

The network admission control manager 14 may store status, device, and user information for each of the endpoints 18. The endpoint information may include, for example, authentication status (authenticated, unauthenticated, authentication failed, log-in time), authentication type, user/device information (user name, device name, device type, location, operating system).

As described above, the network access device 16 may include the network access control server 20, profiler 22, or both the network access control server and profiler. In one embodiment, the NAC server 20 and profiler 22 are implemented in hardware at the network access device 16. For example, the NAC server and profiler may be located on one or more ASICs (application specific integrated circuits). Implementation of the NAC server and NAC profiler in the ASIC enables wire speed processing of NAC policies.

The NAC server 20 is a policy enforcement point between the endpoint devices 18 and the trusted network 10. In one embodiment, the NAC server 20 enforces policies defined in the NAC manager 14. The endpoint devices 18 communicate with the NAC server 20 during authentication, posture assessment, and remediation. In one embodiment, the NAC server 20 continuously communicates with the endpoint device 18 so that updates may be provided, as needed.

Enforcement functions may be accelerated in hardware at the network access device 16. Since the network admission control policy enforcement is performed at the network access device, rather than implemented at software at an appliance within the network, enforcement actions such as traffic policing, replication for inspection, deep packet inspection, policing, shaping, tunneling, etc. can be performed.

The NAC server 20 provides a single choke point where security functions or audits may be imposed. The NAC server 20 may be used to authenticate, authorize, evaluate, and remediate the endpoint devices 18 before they can access the network 10. For example, the NAC server 20 may recognize users, their devices, and their roles in the network, evaluate whether machines are compliant with security policies, enforce policies by blocking, isolating, and repairing non-compliant machines, provide guest access, and audit and report users on the network. The NAC server 20 (alone or in combination with the NAC manager 14) may apply posture assessment and remediation to the endpoint devices 18. As described below, the NAC server 20 identifies whether the endpoint device 18 is compliant with the network's security policies and repairs any vulnerability before permitting access to the network 10.

The NAC server 20 is configured to detect an infected or non-compliant endpoint device 18. For example, an infected endpoint device 18 may have a virus or other damaging element that operates to corrupt data, compromise the integrity of information, erase or modify data, or generally disrupt properly functioning elements within the network. A non-compliant endpoint device 18 may have software, applications, or operating systems that are not up to date or do not meet a specified requirement.

The NAC server 20, either alone or in combination with the NAC manager 14, may perform any number of potential remedies in order to address the presence of an infected computer. If the endpoint device 18 is infected, the NAC server 20 may retrieve information from the NAC manager 14 in order to disable one or more of the policies or services provided to the infected computer, until it properly complies with the requisite security parameters. The NAC manager 14 may leverage or otherwise control dynamic host configuration protocol (DHCP) services in order to disable infected computer. For example, the IP address of the infected computer may be removed or reassigned so that the communicating capability of the infected computer is disabled. Appropriate remedial procedures may be implemented to prohibit the infected computer from communicating to other devices in the network. The NAC server 20 may also direct the infected computer to a remediator or remediation website. The NAC policies applied to the endpoint device 18 are used to limit communication to the remediator website. The infected computer then communicates with the remediator website until the computer is brought in compliance with suitable networking protocols.

In one embodiment, the information collected during evaluation of the endpoints 18 is transmitted to the NAC manager 14 for use in selecting a policy for the endpoint. The NAC server 20 receives information (instructions) from the NAC manager 14 and identifies the policy to apply to the endpoint device 18 and enforces the policy. For example, the NAC server 20 may receive a service template from the NAC manager 14 or the network access device 16 may already have a service template that is appropriate to apply to the endpoint device 18.

In one embodiment, the NAC manager 14 uses data from the profiler 22 to select policies for the endpoint device 18. The profiler 22 may be located at the network access device 16 as described below, or located at an appliance within the network.

The profiler 22 identifies and classifies the endpoint device 18. The identification information may include, for example, device type, user, and location. The device types may include, for example, corporate device, non-corporate device, personal computer (pc) device, non-pc device, printer, wireless access point, camera, sensors (e.g., thermostats, light sensors, badge readers, and the like), etc. The profiler may also identify a user or user role associated with the user logged on to the endpoint device 18. User roles may include, for example, employee, contractor, guest, etc. The profiler 22 sends device information to the NAC manager 14. Device classification rules are pulled by or pushed to the network access device 16 from the manager 14. In one embodiment the profiler 22 provides continuous profiling and device reclassification. Continuous profiling enables anti-spoofing and up-to-date policy enforcement. If an endpoint device 18 misbehaves or masquerades as an endpoint device of one type and later acts as another type of device, the shift in device types can be detected and a device exhibiting a malicious or invalid shift can be quarantined. Since the profiler 22 is in the data path, all traffic sent and received by the endpoint device 18 is visible and available for profiling at the network access device 16. The profiling function may be accelerated in hardware. Thus, deep packet inspection can be used to provide additional profile capabilities.

The profiler 22 may also track the location of the endpoint devices 18, including those that are not capable of authenticating. The profiler 22 can identify endpoint devices that are not associated with a specific user (e.g., printer, IP phone, wireless access point, camera, sensor, etc.). The NAC manager 14 uses the information about the endpoint device 18 provided by the profiler to determine the correct policies for the network admission control server 20 to apply. The profiler 22 may also be used to track user or endpoint device data for use in network planning, determining network utilization, or other functions. Thus, the profiler 22 may be used independent from the network admission control system.

Figure 2:
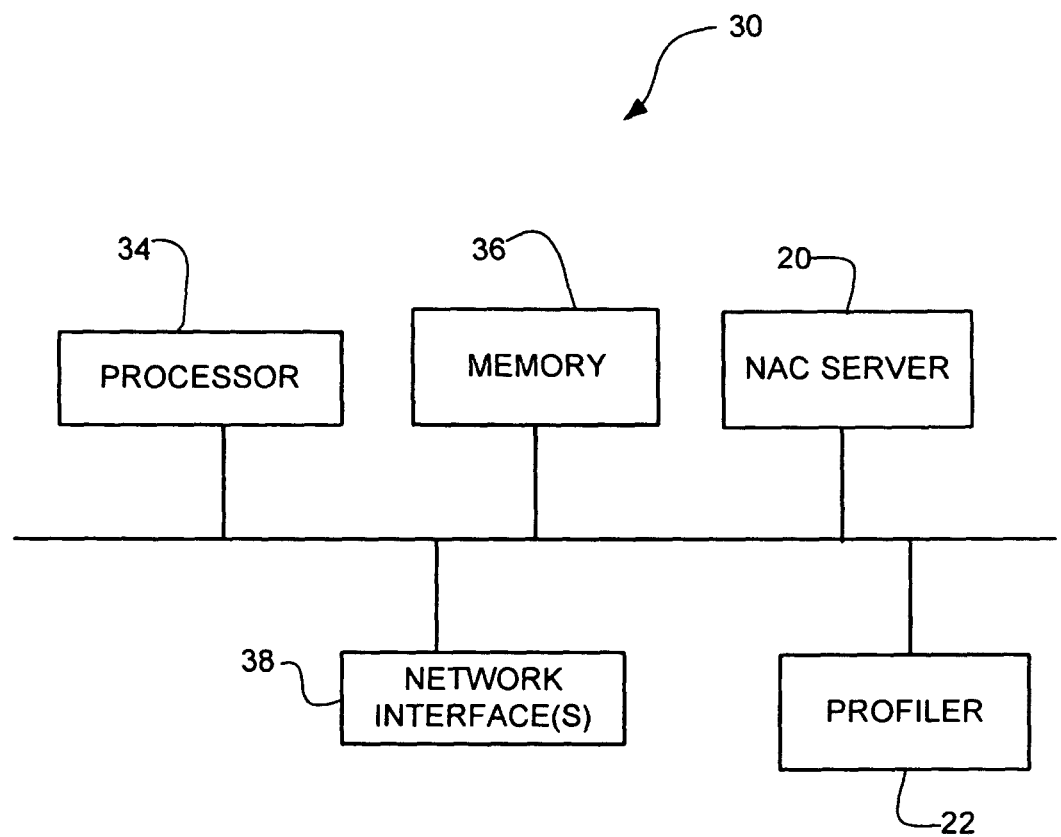
FIG. 2 illustrates an example of a network device useful in implementing embodiments described herein.

An example of a network device 30 (e.g., network access device) that may be used to implement embodiments described herein, is shown in FIG. 2. In one embodiment, the network device 30 is a programmable machine that may be implemented in hardware, software, or any combination thereof. The device 30 includes one or more processors 34, memory 36, and one or more network interfaces 38. As described above, the network device may include components operable to perform NAC server 20 functions or profiler 22 functions.

Memory 36 may be a volatile memory or non-volatile storage, which stores various applications, modules, and data for execution and use by the processor 34. Logic may be encoded in one or more tangible media for execution by the processor 34. For example, the processor 34 may execute codes stored in a computer-readable medium such as memory 36. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network interface 38 may comprise one or more wireless or wired interfaces (line cards, ports) for receiving signals or data or transmitting signals or data to other devices.

It is to be understood that the network device 30 shown in FIG. 2 and described above is only one example and that different configurations of network devices may be used.

Figure 3:
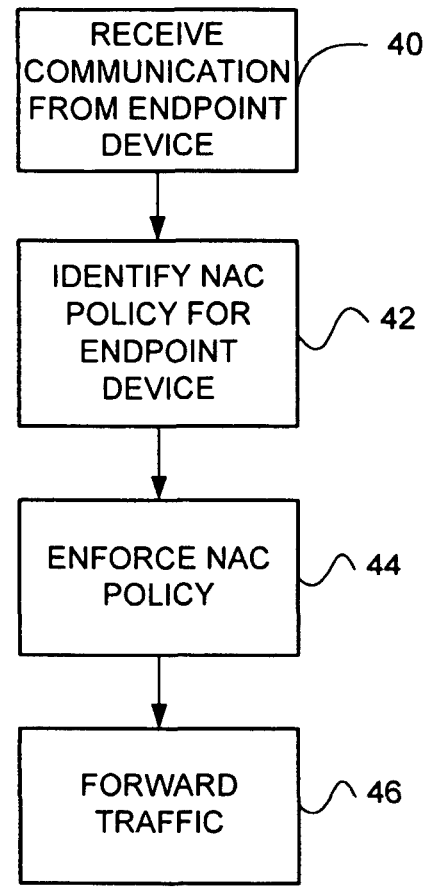
FIG. 3 is a flowchart illustrating an overview of a process for performing network admission control policy enforcement at the network access device, in accordance with one embodiment.

FIG. 3 is a flowchart illustrating an overview of a process for performing network admission control policy enforcement at the network access device 16, in accordance with one embodiment. As shown in FIG. 1, the network admission control server 20 is at the network access device 16 (e.g., switch, router), which is located in a data path between one or more of the endpoint devices 18 and the network 10. At step 40, the network admission control server 20 receives a communication (e.g., packet, frame, message) from one of the endpoint devices 18. The NAC server 20 identifies a NAC policy for the endpoint device 18 (step 42). As previously described, the NAC server 20 and manager 14 may perform various NAC functions (e.g., authentication, posture assessment, and remediation) before selecting a NAC policy for the endpoint 18. In one embodiment, the NAC manager 14 uses the information collected for the endpoint device 18 to select a NAC policy for the endpoint device. The NAC server 20 identifies a policy to apply to the endpoint device based on information received from the NAC manager 14. The NAC server 20 enforces the network admission control policy identified for the endpoint 18 (step 44). The network access device 16 forwards traffic from the endpoint device 18 to the network 10 (step 46) in accordance with the NAC policy applied to the endpoint device. Forwarding of the traffic may be limited based on policies applied to the endpoint device 18 by the NAC server 20.

Figure 4:
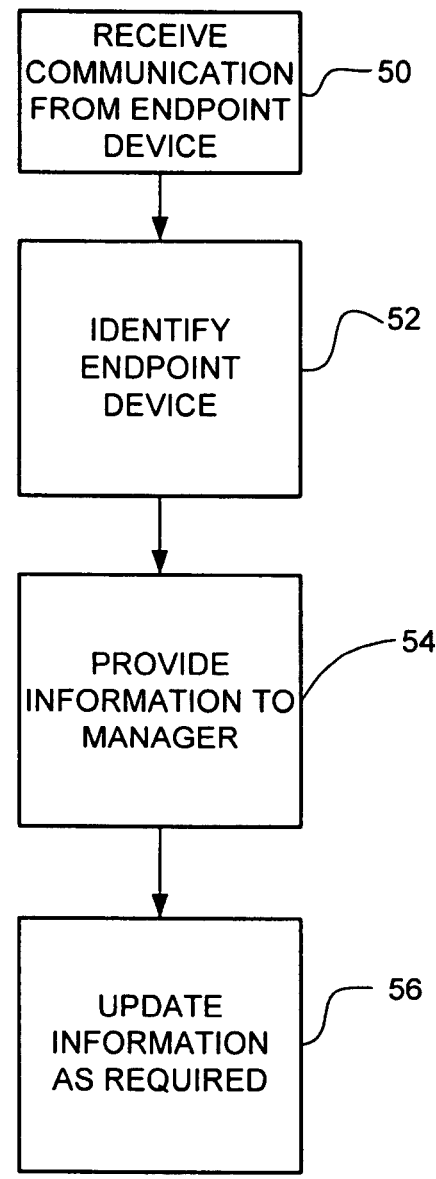
FIG. 4 is a flowchart illustrating an overview of a process for performing profiling at the network access device, in accordance with one embodiment.

FIG. 4 is a flowchart illustrating an overview of a process for performing profiling functions at the network access device 16, in accordance with one embodiment. At step 50, the network access device 16 receives a communication from the endpoint device 18. The profiler 22 at the network access device 16 identifies the endpoint device 18 (step 52). The profiler 22 provides the identification information to a manager (e.g., NAC manager 14 or other central device configured for collecting tracking or audit information) (step 54). The profiler 22 continuously monitors data traffic from the endpoint device 18 and updates the identification information as required (step 56).

Figure 5:
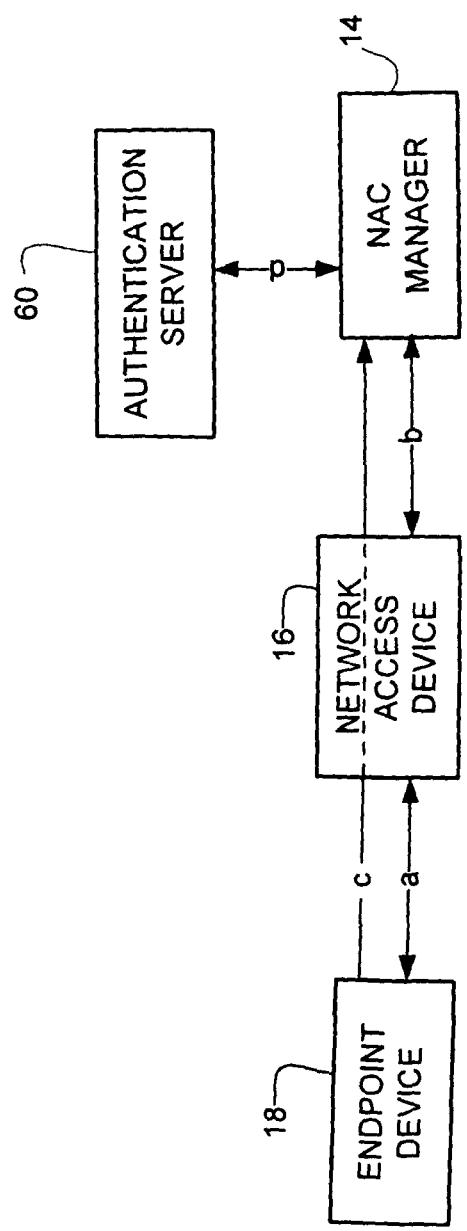
FIG. 5 illustrates an example of communication flow at a network access device in the network of FIG. 1.

FIG. 5 illustrates communication between the endpoint device 18, the network access device 16 (which includes the NAC server 20 and profiler 22), the NAC manager 14 and an authentication server 60. Communication flow (a) between the endpoint device 18 and network access device 16 may include use of IEEE 802.1X or EAP for authentication, or HTTPS, for example. Communication flow (b) between the network admission control server and NAC manager 14 may include use of RADIUS for authentication, authorization, or transmittal of service templates. A management communication protocol may be used for communication between the profiler and NAC manager 14. An initial restricted policy may be applied to the endpoint device 18, which allows DNS based ACLs so that the endpoint can get an IP address. The agent at the endpoint device 18 may then communicate with the NAC manager 14 (communication flow (c)) for posture assessment and remediation. The NAC manager 14 communicates with the authentication server 60 as indicated at communication flow (d).

The following describes example of use cases with reference to FIG. 5. In some of these examples, the endpoint device 18 includes a supplicant, as described above. In some of these examples, the network access device 16 is configured for MAC (Media Access Control) authentication bypass (MAB). MAB allows non-802.1X compliant endpoint devices to have controlled access to the network based on their MAC address. In the following examples, the endpoint device 18 is a printer.

In a first example, the endpoint 18 is a known device, with no supplicant. The network access device 16 is configured for MAB. The endpoint device transmits a communication to the network access device 16 (a). The communication may be, for example, a DHCP request. An IP assignment to the endpoint device 18 may trigger the NAC agent at the endpoint device. The authentication process is then performed. In this example, the network access device 16 triggers an IEEE 802.1x authentication with no response. The network access device 16 next tries MAB (Mac Authentication Bypass) (b). The endpoint device 18 exists in the NAC manager 14 and is identified as a printer. The NAC manager 14 informs the network access device 16 about a printer service template (e.g., via RADIUS) (b). The network access device 16 applies the printer service template to the endpoint device 18.

The next example covers an unknown endpoint device 18 with no supplicant or MAB. The network access device 16 triggers an IEEE 802.1X authentication with no response. The endpoint device 18 does not exist in the NAC manager directory and MAB fails. The NAC manager 14 instructs the network access device 16 to apply a restricted service template to the endpoint device 18 (b). The profiler 22 then classifies the endpoint device as a printer and informs the NAC manager 14. The NAC manager 14 instructs the network access device 16 to apply a printer service template (b). The NAC manager may communicate this information using, for example, a CoA (change of authorization) message. The network access device 16 applies the printer service template to the endpoint device 18.

This next example is for an endpoint device 18 with a supplicant and an unknown posture. The network access device 16 uses IEEE 802.1X to successfully authenticate the endpoint device 18. The NAC manager 14 instructs the network access device 16 to apply a restricted service template to the endpoint device 18 (b). This service template allows DNS based ACLs and related proxy features. The endpoint device 18 gets an IP address and the agent at the endpoint starts up. The endpoint device 18 discovers the NAC manager 14 and initiates posture assessment and remediation (c). Once the endpoint device 18 is compliant with the security policies, the NAC manager 14 informs the network access device 16 about the appropriate service template via CoA, for example (b). The network access device 16 applies the appropriate service template to the endpoint device 18.

The following example is for a known endpoint that is misbehaving. The endpoint device 18 exists in the NAC manager directory and is identified as a printer. The endpoint device 18 sends traffic that violates its profile characteristics (a). The profiler 22 sends a notification to the NAC manager 14 of the violation (b). The NAC manager 14 instructs the network access device 16 to apply "Quarantine for further inspection" service template to the endpoint device 18 (b). The network access device applies the service template to the endpoint device 18.

The network may also include a location server for location based access. At the time of authentication, the network access device 16 sends location attributes to the location server and sends its role to the NAC manager 14 along with authentication information. The NAC manager 14 may include location based policies. For example, a specified user may not be allowed access on one or more floors of a building. If the location server informs the NAC manager 14 that the endpoint device 18 is on an allowed floor, the NAC manager will instruct the network access device 16 to apply an allow service template to the endpoint device. The location server may be used with wired or wireless access by an endpoint device 18.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving a communication from an endpoint device at a network access device located within a data path between the endpoint device and a network;
    identifying a network admission control policy for the endpoint device, wherein identifying said network admission control policy comprises receiving policy information from a network admission control manager in communication with the network;
    enforcing at the network access device, said network admission control policy for traffic received from the endpoint device, wherein enforcing said network admission control policy at the network access device comprises utilizing a service template downloaded from the network admission control manager and locally configured at the network access device, the network admission control manager selecting the service template for the endpoint device and instructing the network access device to apply said service template to the endpoint device;
    performing continuous profiling operations at the network access device to identify the endpoint device, wherein said network admission control policy is based on identification of the endpoint device; and
    forwarding at the network access device, traffic from the endpoint device to the network, in accordance with said network admission control policy.

2. The method of claim 1 wherein identifying said network admission control policy further comprises attempting to authenticate the endpoint device.

3. The method of claim 1 wherein identifying said network admission control policy further comprises assessing a status of the endpoint device.

4. The method of claim 1 wherein enforcing said network admission control policy is performed in hardware at the network access device.

5. The method of claim 1 wherein the network access device is an access layer switch.

6. The method of claim 1 wherein said network admission control policy is applied in a data path between the endpoint device and the network, at a point at which traffic enters the network.

7. The method of claim 1 wherein said profiling is dynamically performed.

8. The method of claim 1 wherein profiling comprises identifying the endpoint device based on a device type, a user role, and a location, and classifying the endpoint device based on rules receives from the network admission control manager.

9. An apparatus comprising:
    a forwarding engine for receiving traffic from an endpoint device and forwarding the traffic to a network; and
    a network admission control server for identifying a network admission control policy for the endpoint device and enforcing said network admission control policy for traffic received from the endpoint device;
    a profiler for performing continuous profiling operations at the network access device to identify the endpoint device, wherein said network admission control policy is based on identification of the endpoint device; and
    memory for storing said network admission control policy;
    wherein the apparatus is configured for operation within a data path between the endpoint device and the network, wherein identifying said network admission control policy comprises receiving policy information from a network admission control manager in communication with the network, and wherein enforcing said network admission control policy at the network access device comprises utilizing a service template downloaded from the network admission control manager and locally configured at the network access device, the network admission control manager selecting the service template for the endpoint device and instructing the network access device to apply said service template to the endpoint device.

10. The apparatus of claim 9 wherein enforcing said network admission control policy is performed in hardware.

11. The apparatus of claim 9 wherein the network admission control server is operable to communicate with a network admission control manager for authentication of the endpoint device.

12. The apparatus of claim 9 wherein the network admission control server is operable to communicate with an agent installed at the endpoint device to assess a status of the endpoint device.

13. An apparatus comprising:
    a forwarding engine for receiving traffic from an endpoint device and forwarding the traffic to a network; a profiler for identifying an endpoint device in communication with the apparatus and providing identification information for each of the endpoint devices in communication with the apparatus to a manager;
    a network admission control server for enforcing a network admission control policy for each of the endpoint devices in communication with the apparatus, said network admission control policy based on said identification information, wherein enforcing said network admission control policy at the network access device comprises utilizing a service template downloaded from the network admission control manager and locally configured at the network access device, the network admission control manager selecting the service template for the endpoint device and instructing the network access device to apply said service template to the endpoint device; and memory for storing said identification information;
wherein the apparatus is configured for operation within a data path between the endpoint device and the network.

14. The apparatus of claim 13 wherein identification of the endpoint device is performed in hardware.

15. The apparatus of claim 13 further comprising a network admission control server for enforcing a network admission control policy for each of the endpoint devices in communication with the apparatus, said network admission control policy based on said identification information.

16. The apparatus of claim 13 wherein the profiler is operable to update said identification information based on data received from the endpoint device.

17. The apparatus of claim 13 wherein the apparatus is configured to perform deep packet inspection for use in identifying a type of endpoint device.

18. The apparatus of claim 13 wherein the profiler is operable to continuously review traffic transmitted to the network access device from the endpoint device.

19. The apparatus of claim 13 wherein the profiler is configured to inspect all traffic transmitted from the endpoint device to the network.

\* \* \* \* \*